(12) United States Patent
Smith

(10) Patent No.: US 7,079,026 B2
(45) Date of Patent: Jul. 18, 2006

(54) METHOD AND APPARATUS OF KARAOKE STORAGE ON A WIRELESS COMMUNICATIONS DEVICE

(75) Inventor: Glen Smith, Durham, NC (US)

(73) Assignee: Sony Ericsson Mobile Communications AB (SE)

( * ) Notice: Subject to any disclaimer, the term of this patent is extended or adjusted under 35 U.S.C. 154(b) by 155 days.

(21) Appl. No.: 10/777,007

(22) Filed: Feb. 11, 2004

(65) Prior Publication Data
US 2005/0140519 A1  Jun. 30, 2005

Related U.S. Application Data

(60) Provisional application No. 60/533,554, filed on Dec. 31, 2003.

(51) Int. Cl.
G08B 1/08 (2006.01)
(52) U.S. Cl. ............... 340/539.22; 340/692; 455/567; 379/373.02
(58) Field of Classification Search ......... 340/539.22, 340/692, 7.58; 379/375.01, 373.01, 373.02, 379/373.03, 373.04; 455/567; 381/119
See application file for complete search history.

(56) References Cited

U.S. PATENT DOCUMENTS 6,583,718 B1 * 6/2003 Curran et al. ............... 340/293
6,873,705 B1 * 3/2005 Graef et al. ................ 379/418
2002/0082007 A1   6/2002 Kangas et al.
2002/0189429 A1  12/2002 Johnson et al.
2003/0019347 A1 * 1/2003 Weiner et al. ............... 84/609
2003/0027605 A1 * 2/2003 Hijii .......................... 455/567
2003/0069655 A1   4/2003 Brenner et al.
2003/0109219 A1   6/2003 Amselem
2003/0194101 A1 * 10/2003 Sexauer et al. ............. 381/120
2005/0190932 A1 * 9/2005 Woo et al. .................. 381/119

FOREIGN PATENT DOCUMENTS

WO    WO 03/050645    6/2003

OTHER PUBLICATIONS

PCT International Search Report; International Application No. PCT/US2004/020848 mailed Nov. 18, 2004.

* cited by examiner

Primary Examiner—Toan N. Pham
(74) Attorney, Agent, or Firm—Coats & Bennett, P.L.L.C.

(57) ABSTRACT

A wireless communications device that alerts a user to a predetermined event includes a transceiver, a speaker, memory, and a controller. First and second pre-recorded audio files are stored in the memory, and may be, for example, pre-recorded music and the user's pre-recorded voice. When the device receives an incoming call, for example, the controller combines the first and second audio files to form a combined audio signal. The controller then plays the combined audio signal through the speaker for the user as a personalized ring tone.

35 Claims, 5 Drawing Sheets

METHOD AND APPARATUS OF KARAOKE STORAGE ON A WIRELESS COMMUNICATIONS DEVICE

RELATED APPLICATIONS

This application claims priority under 35 U.S.C. § 119(e) from the following U.S. provisional application: Application Ser. No. 60/533,554 filed on Dec. 31, 2003. That application is incorporated in its entirety by reference herein.

BACKGROUND

The present invention relates generally to wireless communications devices, and more particularly to storing and playing karaoke on wireless communications devices.

Wireless communication devices typically play a ring tone to announce events to a user, such as an incoming call. Most modern wireless communication devices can store a plurality of pre-recorded ring tones from which the user can choose according to the user's taste. These ring tones may comprise simple tones, but more frequently comprise a sequence of tones forming a melody. The manufacturer typically preloads these melodic ring tones into device memory as audio files.

A growing issue concerning wireless communications devices is the user's inability to personalize these ring tones. For example, because the manufacturer provides only a preset number of ring tones, the user must typically assign the same ring tone to multiple parties. Downloadable ring tones provide a broader selection, but practical constraints regarding the device's memory still limits users to a specified number of pre-recorded ring tones. A similar constraint applies with respect to software programs that enable the user to create new ring tones. One way to avoid this problem would be to allow the user to augment the selected melodic ring tone with the user's voice. However, conventional devices do not permit the user to record his or her voice and play it back in conjunction with the melodic ring tone as an alert.

SUMMARY

The present invention provides a system and method that permits a user of a wireless communication device to record the user's voice, and store it as an audio file in the device's memory. The audio file is stored separately from the pre-recorded melodic ring tones. The device indicates a predetermined event to the user, such as an incoming call, by combining a selected ring tone with a selected voice file. The combined audio signal is then played over a speaker as a ring tone.

In one embodiment, the wireless communications device comprises a transceiver, memory, a speaker, and a controller. The memory facilitates storage of pre-recorded ring tones and recorded voice as audio files. Upon receipt of pre-determined event, the controller combines the two audio files to form a combined audio signal. This combined audio signal is then played through the speaker for the user.

DETAILED DESCRIPTION

Figure 1:
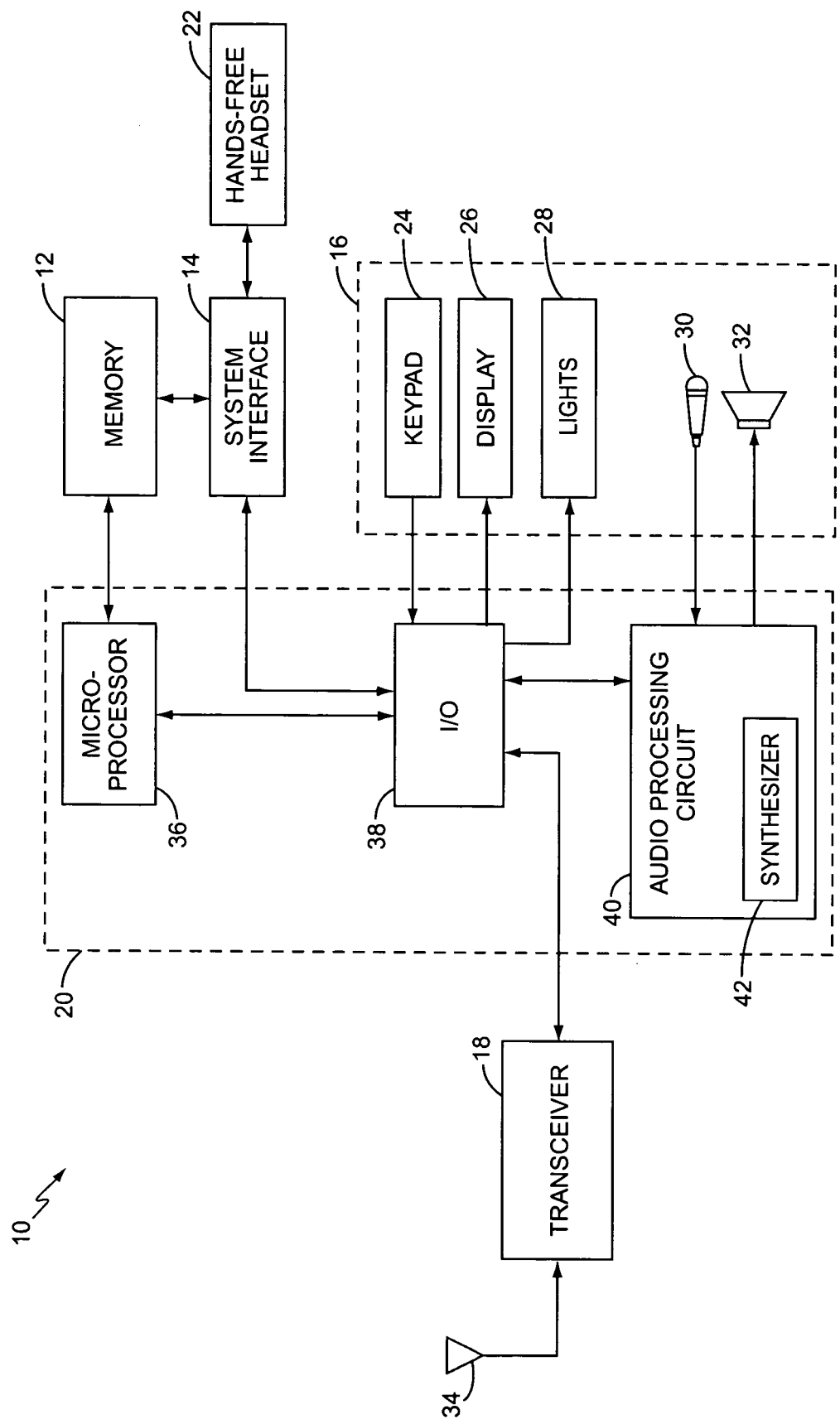
FIG. 1 illustrates a wireless communications device according to one embodiment of the present invention.

Referring now to FIG. 1, a block diagram of wireless communications device according to one embodiment of the present invention is shown therein, and indicated generally by the number 10. Device 10 memory 12, system interface 14, user interface 16, transceiver 18, and control circuitry 20. As shown in the figures, device 10 embodies a cellular telephone. The present invention is not, however, limited to a cellular telephone but may be embodied in other communication devices. For example, the present invention also contemplates satellite telephones, personal communication services (PCS) devices, personal data assistants (PDAs), palm-top computers, and the like.

Memory 12 represents the entire hierarchy of memory in device 10, including both random access memory (RAM) and read-only memory (ROM). Operating instructions and data required for operation of device 10 may be stored in a non-volatile partition that is accessible to the user. This portion of memory 12, as will later be described, may also store music files and voice files to be used as ring tones. Other information, such as temporary data and/or instructions, may be stored in a volatile partition that is not accessible to the user. Memory 12 includes devices such as EPROM, EEPROM, and/or flash memory, and may be implemented as a discrete device, stacked device, or integrated with microprocessor 36.

System interface 14 facilitates the inter-connection of device 10 with one or more peripheral devices, such as a battery charger, an external computing device, a digital video camera, external memory, or a hands-free headset 22. Through system interface 14, users may charge the battery of device 10, exchange data with external peripheral devices, control the operation of the external peripheral devices, and, as described in more detail below, record voice files for storage on memory 12.

User interface 16 comprises a keypad 24, a display 26, lights 28, a microphone 30, and a speaker 32. Keypad 24 includes an alphanumeric keypad, and optionally, other navigation controls. Keypad 24 allows the operator to dial numbers, enter commands, play games, and select options from various menus stored in memory 12. Display 26 displays information to the user including dialed digits, incoming caller identification, images, video sequences, call status information, menu options, and other service information. Lights 28 provide visual indications to the user, and may comprise backlighting for keypad 24 or display 26, for example.

Microphone 30 converts the user's speech into electrical audio signals that will be transmitted to a remote party by device 10. Typically, microphone 30 sends the converted signals to transceiver 18 via audio processing circuit 40. Transceiver 18, which couples to antenna 34, transmits the converted speech signals to one or more remote parties.

Speaker 32 converts electrical audio signals into audible sounds for the user, and receives signals from transceiver 18 via audio processing circuit 40. The user hears audible sounds, such as the music files used as ring tones, through speaker 32. As described in more detail below, the user may listen to the music files over speaker 32 while recording his voice for storage in memory 12 using microphone 30. Then, upon receiving an incoming call for example, both the music file and the user's voice are played for the user through speaker 32 as the ring tone.

Transceiver 18, as previously stated, couples to antenna 34 and facilitates voice and/or data communications between the user of device 10 and one or more remote parties. Transceiver 18 is a fully functional cellular radio transceiver that operates according to standards well known in the art, including Global System for Mobile Communications (GSM), TIA/EIA-136, cdmaOne, cdma2000, UMTS, and Wideband CDMA.

Control circuitry 20 interconnects memory 12, system interface 14, user interface 16, and transceiver 18, and controls the operation of device 10. Control circuitry 20 comprises a microprocessor 36, an input/output circuit 38, and an audio processing circuit 40. Microprocessor 36 may be implemented as one or more microprocessors, and may be any suitable processor known in the art. This includes general purpose and special purpose microprocessors, as well as digital signal processors (DSPs). Microprocessor 36 controls the operation of device 10 according to programs stored in memory 12, and generates control signals to combine and playback music and voice stored as audio files in memory 12. As will be described in more detail later, microprocessor 36 is configured according to the present invention to combine a selected ring tone with a selected voice file to form a combined audio signal, and play the combined audio signal through speaker 32.

Input/output circuit 38 interfaces microprocessor 36 with system interface 14, keypad 24, lights 28, audio processing circuit 40, and transceiver 18. Audio processing circuit 40 provides basic analog output signals to speaker 32 and accepts analog audio inputs from microphone 30. Thus, the user of device 10 may communicate to a remote party via transceiver 18, as well as hear audible sounds rendered by speaker 32.

Audio processing circuit 38 may comprise a synthesizer 42 and, as will be described in more detail below, circuitry used to process audio signals from/to microphone 30 and speaker 32, respectively. Synthesizer 42 may be, for example, a Musical Instrument Digital Interface (MIDI) synthesizer that synthesizes audio files for playback to a user of device 10. These audio files include, but are not limited to, polyphonic music used as ring tones. The information carried in the audio files may be information regarding a note to be played, when to change tones, volume, various instruments, and/or sounds to be played or synthesized, and how long to sustain a given note. Synthesizer 42, via built in hardware and/or software, reads these files and renders them as audio to the user.

Figure 2:
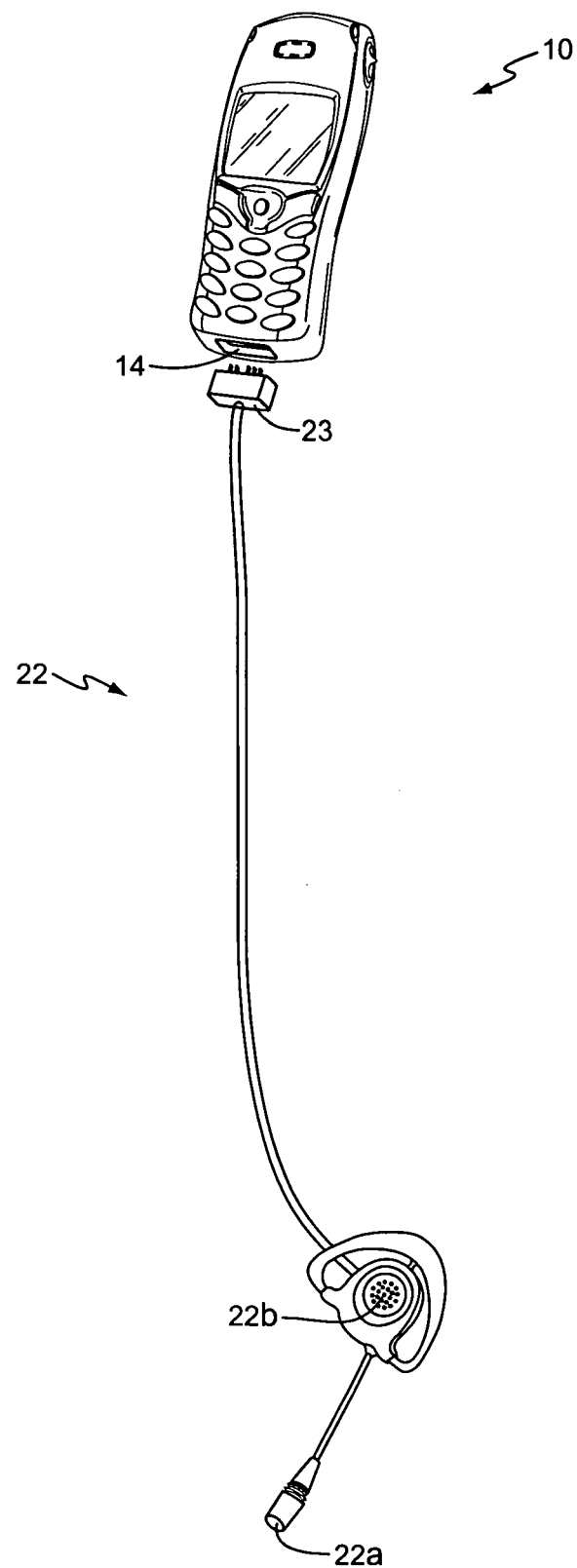
FIG. 2 illustrates a mobile telephone having a hands-free headset according to one embodiment of the present invention.

FIG. 2 illustrates the physical appearance of an exemplary mobile communication device 10 according to the present invention. In this embodiment, device 10 couples to hands-free headset 22 via a connector 23 that plugs into system interface 14. Hands-free headset 22 also includes a microphone 22a that allows the user to send audio signals to device 10, and a speaker 22b that permits the user to hear audio from device 10. Microphone 22a and speaker 22b operate in substantially similarly to microphone 30 and speaker 32. Thus, the details of their operation need not be repeated here. It is sufficient to say, however, that microphone 22a may be used to capture the user's voice while the user listens to a music file over speaker 22b.

As previously stated, conventional mobile communications devices typically allow the user to select a pre-recorded music file from memory 12, and assign it to a particular remote party. Upon receipt of an incoming call from the remote party, device 10 plays the selected music file through speaker 32, or if hands-free headset 22 is employed, speaker 22b. However, conventional devices do not permit the user to augment the selected music file with a recording of their own voice, and use it to alert the user to some predetermined event. The present invention permits the user to record and store his voice as an audio file in memory 12 separately from the selected music file. Upon receipt of an incoming call, audio processing circuit 40 mixes the selected music file with the user's recorded voice file to form a combined audio signal. The combined audio signal is then rendered through speaker 32 or 22b as a ring tone.

Figure 3:
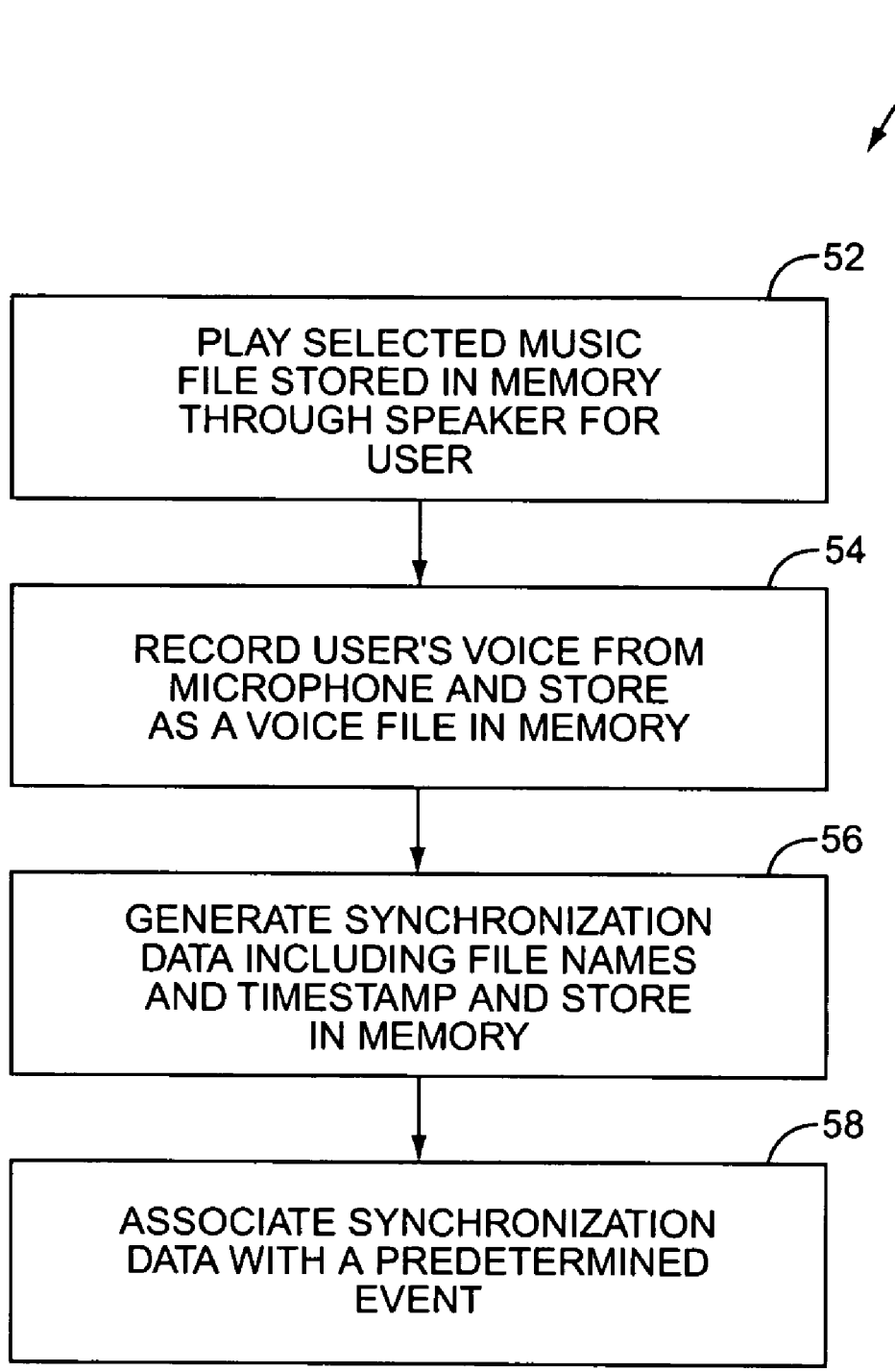
FIG. 3 illustrates a method of recording the user's voice according to one embodiment of the present invention.

FIG. 3 illustrates how the user records his voice according to one embodiment of the present invention. In method 50, the user first selects a pre-recorded music file that is stored in memory 12, and plays it through speaker 32 or 22b (box 52). The user may select and play the music file using a menu system (not shown) on device 10, for example, or by any other manner known in the art. While device 10 plays the selected music file, microprocessor 36 activates microphone 30 or microphone 22a to permit the user to record and store his voice as an audio file in memory 12 (box 54).

Once recorded, the audio file is stored separately from the music file (box 54). The music file and the audio file are not pre-mixed and stored in memory 12 as a single combined audio file, but instead, are stored separately and mixed to form a combined audio signal when an incoming call is received. This permits manipulation and/or routing of the music file and the voice file independently from one another in a manner not possible with a single pre-mixed audio file.

Storing the music file and the voice file separately, however, necessitates the need for a mechanism to associate the two audio files. Therefore, the present invention also generates synchronization data that identifies the music file and the voice file, and stores this synchronization data as a configuration file in memory 12 (box 56). The synchronization data may also include a timestamp that permits microprocessor 36 to synchronize playback of the voice file with the playback of the music file.

By way of example, consider a music file that has a one-second introductory portion. The user may wish to preserve this one-second period as an instrumental "lead-in" to his recorded vocal audio. In one embodiment, microprocessor 36 starts a timer when the music file begins playing, and stops the timer when the user begins to sing into microphone 30 or 22a. Microprocessor 36 then writes the value of the timer (e.g., 1 sec) to the synchronization data as the timestamp. In another embodiment, microprocessor 36 detects the start of the user's voice, and associates the timer value with a specific "note-on" event contained in the music file. Here, the value of the timer, and ultimately the timestamp, may indicate the number of "ticks" (i.e., units of time per note in the file) from the beginning of the music file. In either case, microprocessor 36 will use this timestamp information to synchronize the playback of the recorded voice file to the playback of the recorded music file.

Once microprocessor 36 generates and stores the synchronization data in memory 12, the user may employ a menu system (not shown) on device 10 to assign the generated configuration file containing the synchronization data to a particular party. Those skilled in the art will realize that various methods for associating the configuration file to a particular remote party exist. However, in one embodiment of the present invention, the user assigns the configuration file to a selected remote party in much the same manner as the user currently assigns an individual ring tone (box 58).

Figure 4:
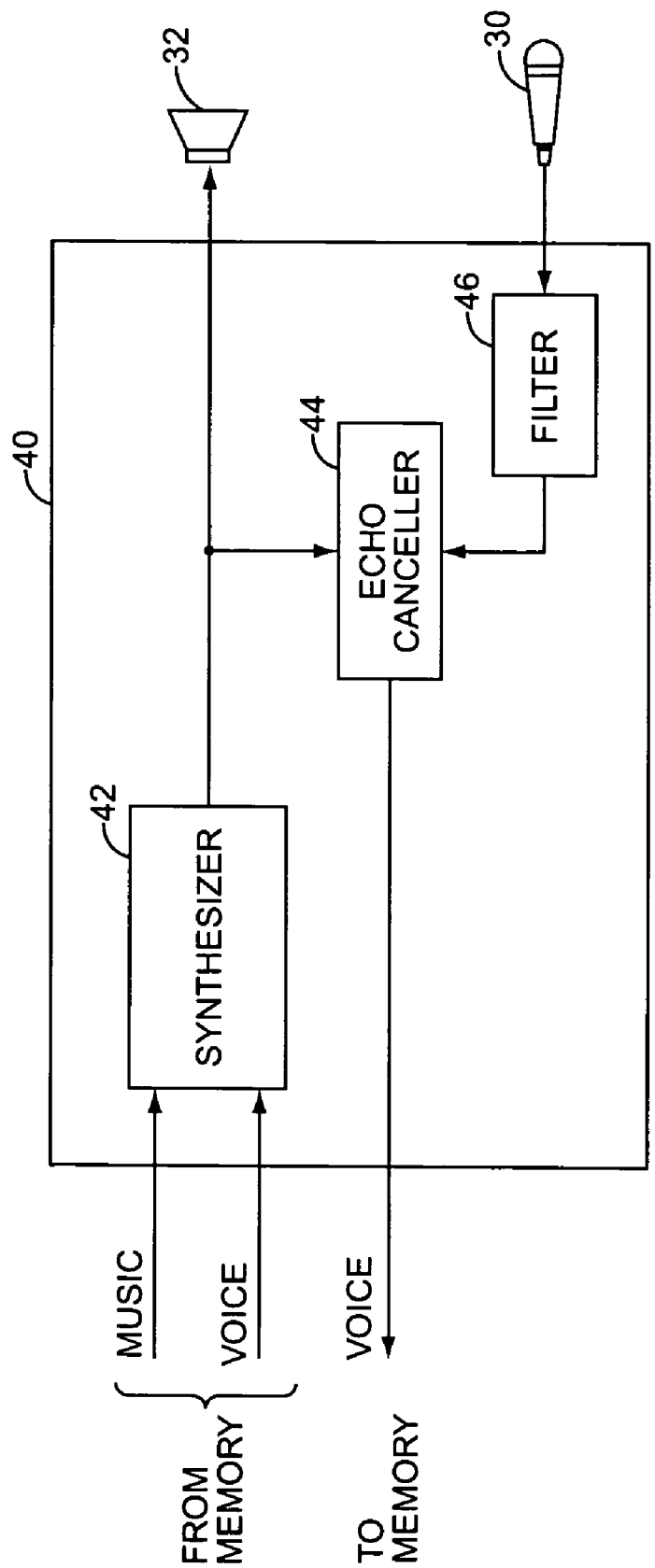
FIG. 4 illustrates one embodiment of an apparatus for recording the user's voice and playing a combined audio signal according to one embodiment of the present invention.

To ensure a high quality voice recording, the present invention records only the acoustic sound present at microphone 30 or 22a, and filters out any ambient noise from the incoming voice signal prior to storing the audio file in memory 22. FIG. 4 illustrates how audio processing circuit 40 may accomplish this according to one embodiment of the present invention. Audio processing circuit 40 may include an echo canceller 44 and a filter 46 to remove acoustic sounds other than the user's voice from the incoming signal. For example, in one embodiment of the present invention, the music file plays over speaker 32 while microphone 30 or 22a captures the user's voice. Because microphone 32 or 22a records acoustic sound, it may also pickup the playback of the music file emanating from speaker 32, as well as other noise. Filter 46 and echo canceller 44 would remove this "background" noise using filtering and echo cancellation techniques, and allow only the user's voice to pass through for recording. An alternate embodiment further isolates the vocal performance of the user by playing the music file through speaker 22b on headset 22, and capturing the user's voice through microphone 32 or 22a.

Figure 5:
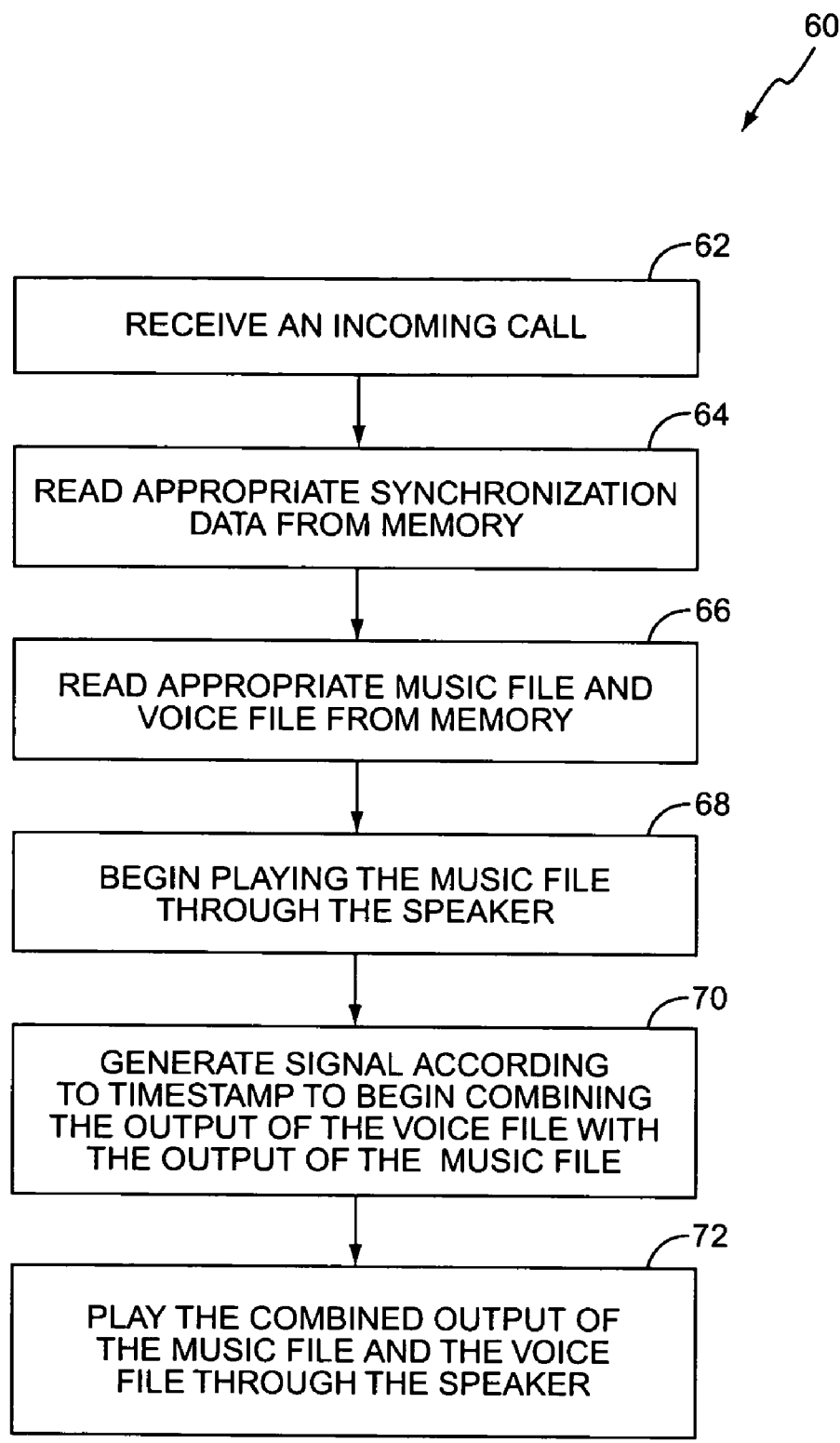
FIG. 5 illustrates a method of playing a combined audio signal as a ring tone according to one embodiment of the present invention.

FIGS. 4 and 5 illustrate how microprocessor 36 combines the music file and the user's recorded voice file stored in memory 12 to form a combined audio signal according to one embodiment of the present invention. Method 60 begins when the device 10 receives an incoming call (box 62). Microprocessor 36 locates the appropriate configuration file assigned to the caller by the user, and reads the synchronization data to determine the identities of the music file, the voice file, and the timestamp value (box 64). In one embodiment, microprocessor 36 determines the appropriate configuration file by examining the calling party ID, and matching the ID to the appropriate configuration file. Once found, microprocessor 36 first sets an internal timer to the value of the timestamp contained in the synchronization data. Then, microprocessor 36 generates a control signal to synthesizer 42 in audio processing circuit 40 to read the appropriate music file from memory 12 (box 66), and play the music file through speaker 32 or 22b. When synthesizer 42 begins playing the music file, microprocessor 36 starts the internal timer (box 68). When the timer expires, microprocessor 36 generates another signal to synthesizer 42 to begin combining the associated voice file audio with the music file audio (box 70). Synthesizer 42 mixes the voice file audio with the music file audio to form a combined audio signal, and outputs the combined audio signal through speaker 32 or 22b as a ring tone (box 72).

Those skilled in the art will readily appreciate that while the preceding discussion has couched the present invention in terms of a ring tone and an incoming call, it is not so limited. The present invention may actually be used to alert the user to the occurrence of any predetermined event, such as a page, an alarm, or an alert. Further, it is not required that the audio files be music and voice, nor is the present invention limited to the mixing of only two audio files. In fact, the present invention contemplates using two or more music files, and/or voice files, or any combination thereof, to form a combined audio signal.

Additionally, to compensate for messaging and signaling delay in device 10, synthesizer 42, microprocessor 36, and/or other processing circuitry may be associated with circuitry that delays the playback of the music and/or voice audio files to the user, and/or the generation of the control signals. One such example would be an equalization filter or compression circuitry. The delay would permit adequate time for microprocessor 36 generate and send control signals to synthesizer 42 before the audio is actually rendered to the user. This would appear to the user as more accurate synchronization of the combined audio signal rendered through speaker 32 or 22b.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of alerting a user of a wireless communications device comprising:
   generating a signal to combine a first audio file and a second audio file to form a combined audio signal according to synchronization information stored in memory of a wireless communication device; and
   playing said combined audio signal through a speaker in said wireless communications device responsive to a predetermined event.

2. The method of claim 1 wherein said first audio file comprises a pre-recorded music file.

3. The method of claim 1 wherein said second audio file comprises a voice file.

4. The method of claim 3 wherein said voice file comprises the user's pre-recorded voice.

5. The method of claim 1 further comprising associating said first audio file with said second audio file.

6. The method of claim 5 wherein associating said first audio file with said second audio file comprises storing a configuration file in memory that identifies said first and second audio files.

7. The method of claim 6 wherein the synchronization information comprises timing information to synchronize the playback of said second audio file with said first audio file.

8. The method of claim 1 wherein said synchronization information comprises a timestamp that synchronizes the playback of said second audio file with said first audio file.

9. The method of claim 1 wherein said predetermined event is an incoming call.

10. The method of claim 1 wherein said predetermined event is an alarm.

11. The method of claim 1 wherein said predetermined event is a page.

12. The method of claim 1 wherein said predetermined event is an alert.

13. The method of claim 1 further comprising recording the user's voice using a microphone communicatively connected to said wireless communications device.

14. The method of claim 1 wherein combining a first audio file and a second audio file to form a combined audio signal is done responsive to said predetermined event.

15. A method of alerting a user of a wireless communications device comprising:
   storing a first audio file in memory of said wireless communications device;
   storing a second audio file in said memory of said wireless communications device;
   combining said first audio file and said second audio file according to synchronization data stored in said memory to form a combined audio signal responsive to an incoming call; and playing said combined audio signal as a ring tone in said wireless communications device.

16. The method of claim 15 further comprising recording the user's voice using a microphone communicatively connected to said wireless communications device.

17. The method of claim 16 wherein said pre-recorded voice file comprises the user's voice.

18. The method of claim 15 further comprising generating a signal to combine said first audio file and said second audio file according to said synchronization data.

19. The method of claim 15 wherein said synchronization data comprises information that identifies said first and second audio files stored in said memory.

20. The method of claim 19 wherein said synchronization data further comprises information that synchronizes the playback of said second audio file with the playback of said first audio file.

21. The method of claim 15 wherein combining said first audio file and said second audio file to form a combined audio signal comprises mixing a pre-recorded music file with a pre-recorded voice file.

22. A wireless communications device comprising:
a wireless transceiver;
a speaker to render audio to a user;
memory to store a first audio file and a second audio file, and timing data associated with the first and second audio files; and
a controller to synchronize the playback of said first and second audio files as combined audio signal through said speaker according to the timing data responsive to a predetermined event.

23. The device of claim 22 further comprising a microphone to record said second audio file while playing said first audio file through said speaker.

24. The device of claim 23 wherein said microphone records the user's voice.

25. The device of claim 24 wherein said microphone is disposed in a hands free headset coupled to said wireless communications device.

26. The device of claim 22 wherein said controller is further configured to associate said first audio file with said second audio file, and store said association in said memory.

27. The device of claim 26 wherein said association comprises identification data that identifies said first and second audio files stored in said memory.

28. The device of claim 22 wherein said controller is further configured to control a synthesizer according to said timing data stored in said memory.

29. The device of claim 22 further comprising a synthesizer communicatively coupled to said controller and said memory.

30. The device of claim 29 wherein said controller is further configured to control said synthesizer to combine said first and second audio files responsive to said predetermined event.

31. The device of claim 22 wherein said predetermined event is an incoming call.

32. The device of claim 22 wherein said predetermined event is an alarm.

33. The device of claim 22 wherein said predetermined event is a page.

34. The device of claim 22 wherein said predetermined event is an alert.

35. The device of claim 22 wherein said wireless communications device comprises a cellular phone.

* * * * *